(No Model.) 2 Sheets—Sheet 1.

H. H. WAIT.
COMMUTATOR CONNECTION FOR DYNAMO ELECTRIC MACHINES.

No. 544,329. Patented Aug. 13, 1895.

Witnesses:
George L. Cragg.
W. Clyde Jones.

Inventor:
Henry H. Wait.
By Barton & Brown
Attorneys.

(No Model.) 2 Sheets—Sheet 2.
H. H. WAIT.
COMMUTATOR CONNECTION FOR DYNAMO ELECTRIC MACHINES.
No. 544,329. Patented Aug. 13, 1895.

Witnesses:
George L. Cragg.
W. Clyde Jones.

Inventor:
Henry H. Wait.
By Burton & Brown
Attorneys

UNITED STATES PATENT OFFICE.

HENRY H. WAIT, OF CHICAGO, ILLINOIS, ASSIGNOR TO THE WESTERN ELECTRIC COMPANY, OF SAME PLACE.

COMMUTATOR CONNECTION FOR DYNAMO-ELECTRIC MACHINES.

SPECIFICATION forming part of Letters Patent No. 544,329, dated August 13, 1895.

Application filed March 1, 1895. Serial No. 540,129. (No model.)

*To all whom it may concern:*

Be it known that I, HENRY H. WAIT, a citizen of the United States, residing at Chicago, in the county of Cook and State of Illinois, have invented a certain new and useful Improvement in Dynamo-Electric Machines, (Case No. 1,) of which the following is a full, clear, concise, and exact description, reference being had to the accompanying drawings, forming a part of this specification.

My invention relates to armatures for dynamo-electric machines, and its object is to provide improved means for connecting the several coils of the armature with their respective commutator-segments.

Difficulty has been experienced heretofore due to short-circuiting of the armature-coils caused by the rubbing together of the conductors crossing at the end of the armature, the centrifugal force developed by the rotation of the armature causing the conductors to shift their positions and rub against the conductors in contact with which the rest, to thus wear away the insulation and leave the bare conductors in contact. This difficulty is enhanced in high-voltage machines, where, in consequence of the small currents traversing the armature-coils, the armature is wound with wire of comparatively small cross-section, the conductors being thus quite flexible and capable of considerable relative movement due to the centrifugal force. To overcome the obstacle thus presented, I provide a box or receptacle in which are located the crossing wires that connect the commutator-segments with the ends of their respective armature-coils, the space within the box and about the conductors being filled with an insulating substance, as sulphur, which may be flowed into the box after the wires are in position and allowed to solidify to maintain the conductors rigidly in position.

Figure 1:
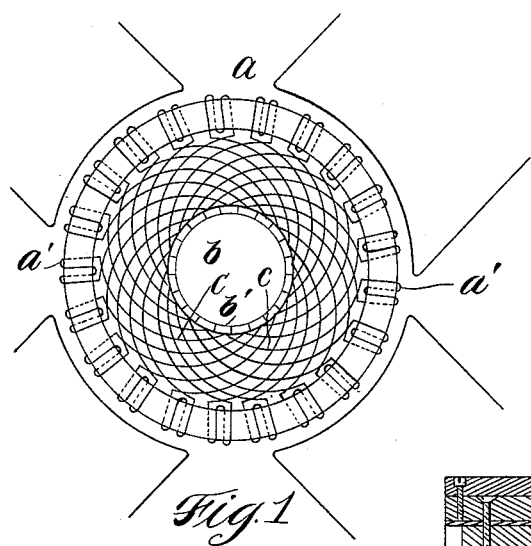
Figure 2:
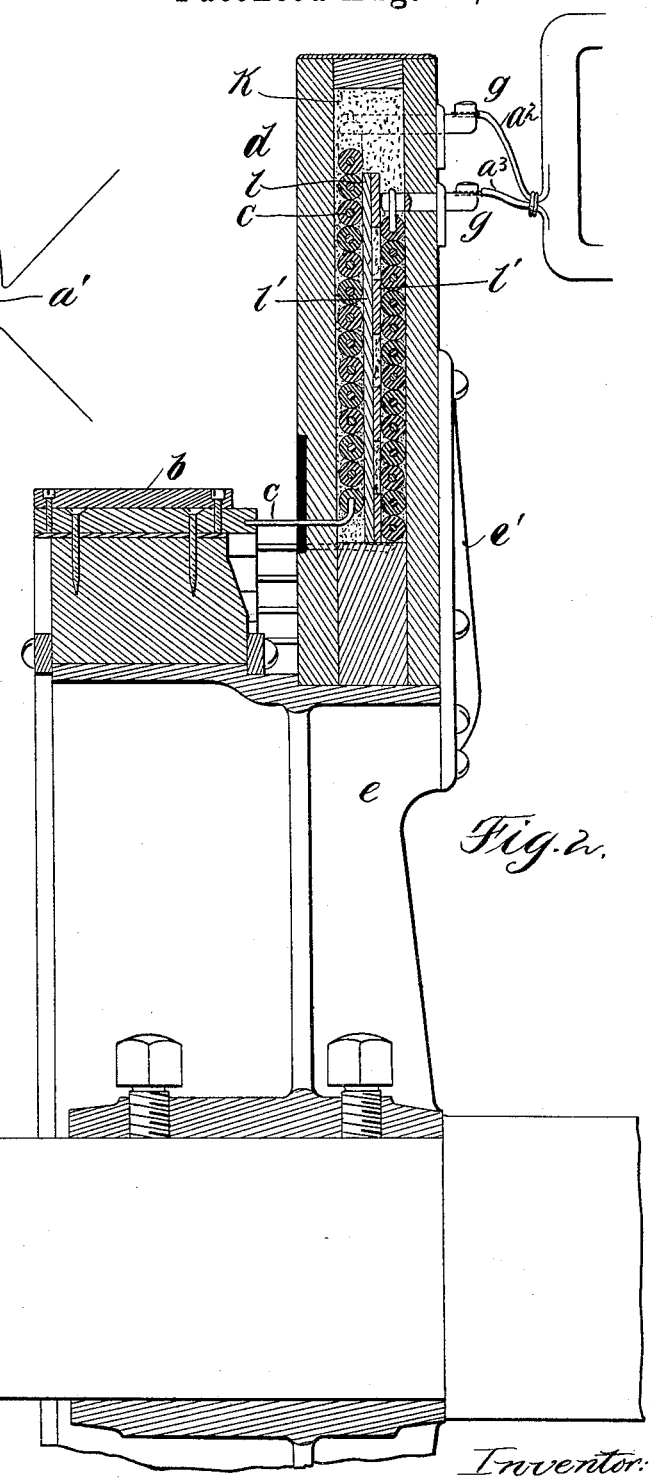
Figure 3:
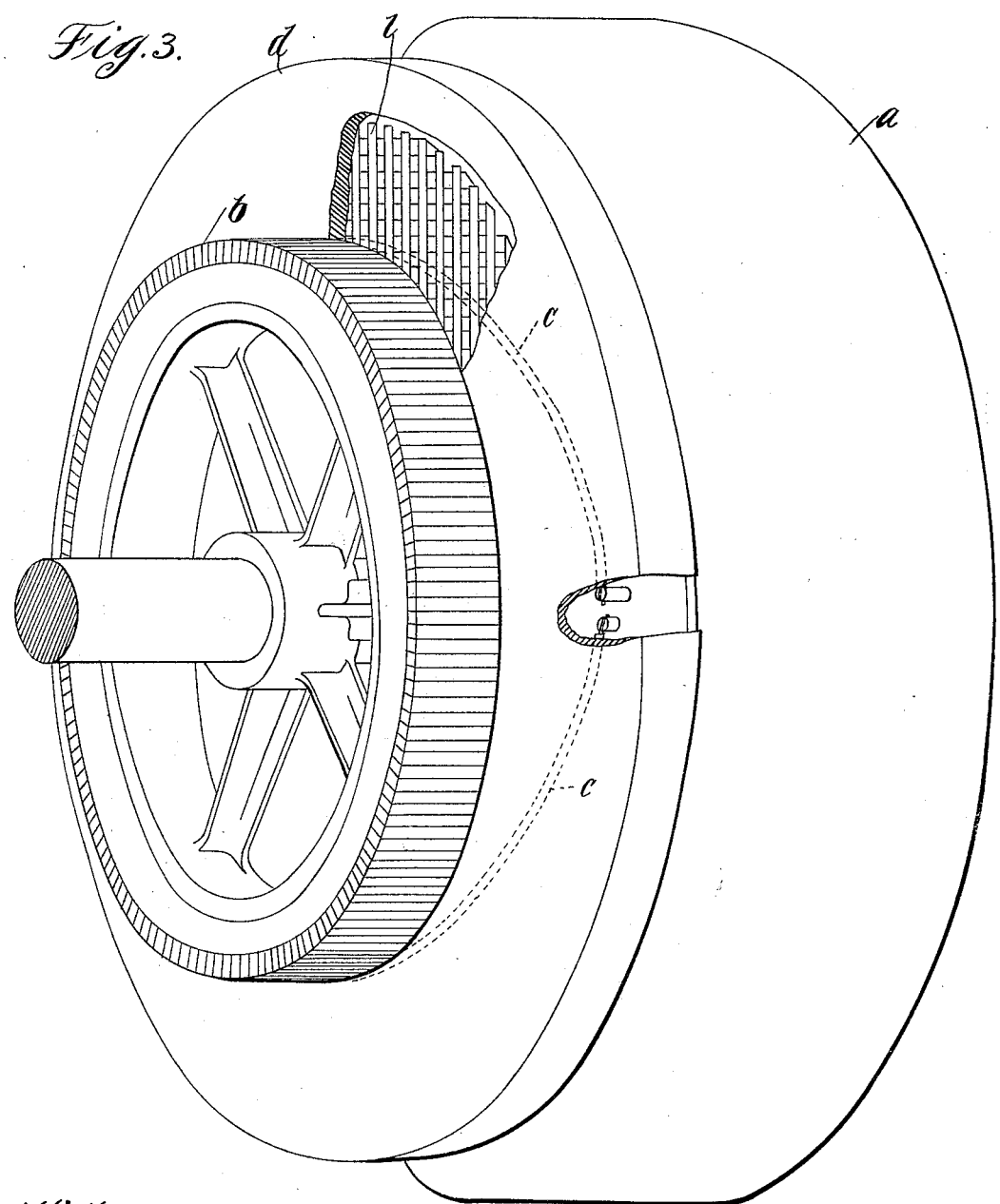

Referring to the accompanying drawings, Figure 1 is a diagram of an armature-winding, illustrating the wires employed in connecting the armature-coils with the commutator-segments. Fig. 2 is a sectional view illustrating the connection-box of my invention. Fig. 3 is a perspective view, partially in section, of the connection-box.

Like letters refer to like parts throughout the several figures.

In Fig. 1 is illustrated an armature $a$, the coils $a'$ of which are connected with the commutator-segments $b'$ of the commutator $b$ by conductors $c$ passing across the end of the armature. It has been customary, heretofore, to place the conductors $c$ upon the end of the armature, and, as above explained, this method has proved unsatisfactory, since the constant shifting of the conductors, due to centrifugal force, tends to wear away the insulation and short-circuit the coils. In accordance with my invention I provide between the armature proper and the commutator a box $d$, which I have designated a "connection-box."

In Fig. 2 the box $d$ is mounted upon the spider $e$ that supports the commutator $b$. The conductors $c$ are placed in position within the box, their ends being connected, respectively, with commutator-segments $b'$ and binding-posts $g$, to which the ends $a^2$ $a^3$ of the armature coils are attached. The conductors $c$, having been placed in position and properly connected, an insulating substance $k$ is flowed about the conductors in the box, the box being completely filled, so that relative movement of the conductors is prevented. I find that sulphur forms a very good insulating substance for this purpose. The insulating substance thus filling the spaces between the conductors, additional insulation is afforded.

Where a number of layers of connecting-wires $c$ are employed, as shown in Fig. 2, a partition $l$ may be interposed between the layers to more effectually maintain the conductors in position. I preferably construct the partition of strips or slats $l'$ arranged perpendicularly to form a lattice-work, thus leaving openings into which the insulating material may flow.

The connection-box is held in place upon the spider $e$ by means of an arm $e'$, secured to the box and to the spider. By removing the plate the connection-box may be readily removed for repair or other purpose.

By my invention, the manufacture of the armature may be greatly facilitated, as the armature-coils may be mounted upon the armature-core, the connecting-wires properly placed within the box, and the commutator built, after which the three independent structures may be assembled and the necessary electrical connections made to complete the structure as a whole. If it be necessary to repair any one of the three parts they may be readily separated for the purpose. The connection-box, as completed ready for assembling, is provided with terminals for connection with the armature-coils or the commutator.

As shown in Fig. 2, the commutator and connection-box are mounted upon a common spider, which may be removed from the armature-shaft, the commutator and connection-box thus constituting one structure, which may be connected with or disconnected from the armature-coils at will.

It will appear that my invention is capable of embodiment in other forms than that illustrated, and I do not, therefore, limit myself to details; but

What I claim as new, and desire to secure by Letters Patent, is—

1. In an armature, the combination with a connection box, of conductors connecting the armature coils with the commutator segments, and inclosed in said box to protect the same from injury, substantially as described.

2. In an armature, the combination with a connection box, of conductors connecting the armature coils with the commutator segments, located in said box, and a substance in said box and surrounding said conductors to maintain the same in position, substantially as described.

3. In an armature, the combination with a connection box, of conductors connecting the armature coils with the commutator segments, located in said box, and an insulating substance flowed or forced into said box and about said conductors to insulate the conductors and maintain the same in position, substantially as described.

4. The combination with a connection box, of conductors connecting the armature coils with the commutator segments, located in said box, said box being detachably connected to the armature coils, substantially as described.

5. The combination with a spider removably mounted upon the armature shaft, of a commutator and a connection box mounted upon said spider, said connection box containing the conductors joining the armature coils with the commutator segments, substantially as described.

In witness whereof I hereunto subscribe my name this 5th day of January, A. D. 1895.

HENRY H. WAIT.

Witnesses:
W. CLYDE JONES,
DE WITT C. TANNER.